United States Patent
Huang

(10) Patent No.: US 10,203,534 B2
(45) Date of Patent: Feb. 12, 2019

(54) DISPLAY MOTHERBOARD COMPRISING FIRST AND SECOND SUB-SUPPORTING LAYERS EACH COMPRISING A PLURALITY OF LAYER STRUCTURES AND MANUFACTURING METHOD THEREOF, DISPLAY PANEL AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Shiqiang Huang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 310 days.

(21) Appl. No.: 15/082,497

(22) Filed: Mar. 28, 2016

(65) Prior Publication Data

US 2017/0059919 A1    Mar. 2, 2017

(30) Foreign Application Priority Data

Sep. 1, 2015   (CN) ........................ 2015 1 0552976

(51) Int. Cl.
G02F 1/1333    (2006.01)
G02F 1/1339    (2006.01)

(52) U.S. Cl.
CPC ...... G02F 1/133351 (2013.01); G02F 1/1339 (2013.01)

(58) Field of Classification Search
CPC .............. G02F 1/133351; G02F 2001/133302
See application file for complete search history.

(56) References Cited

U.S. PATENT DOCUMENTS

2001/0004281 A1   6/2001  Sasaki
2005/0253994 A1*  11/2005 Kamijima ......... G02F 1/133351
                                                    349/155

(Continued)

FOREIGN PATENT DOCUMENTS

CN    101078828 A    11/2007
CN    102200663 A     9/2011

(Continued)

OTHER PUBLICATIONS

First Office Action dated Jul. 26, 2017 in corresponding Chinese Patent Application No. 201510552976.4.

*Primary Examiner* — Paul Lee
(74) *Attorney, Agent, or Firm* — Nath, Goldberg & Meyer; Joshua B. Goldberg

(57) ABSTRACT

Embodiments of the present invention provide a display motherboard and a manufacturing method thereof, a display panel and a display device. The display motherboard includes a plurality of display panels defined by a plurality of cutting lines, each of the display panels having a display area and a peripheral area, each of the display panels including a first substrate and a second substrate provided opposite to each other, a position corresponding to the peripheral area between the first substrate and the second substrate being provided with a sealant. The display motherboard further includes a supporting layer provided between the sealant and the cutting lines, the supporting layer being provided on the first substrate and/or the second substrate for supporting the first substrate and the second substrate when cutting the display motherboard.

13 Claims, 3 Drawing Sheets

(56) References Cited

U.S. PATENT DOCUMENTS

| | | | |
|---|---|---|---|
| 2010/0149463 A1* | 6/2010 | Shimizu | G02F 1/13394 349/106 |
| 2011/0090443 A1* | 4/2011 | Han | G02F 1/1339 349/124 |
| 2011/0234967 A1 | 9/2011 | Kim | |
| 2011/0285954 A1* | 11/2011 | Minami | H01J 9/261 349/153 |
| 2012/0008085 A1* | 1/2012 | Kim | G02F 1/13394 349/155 |
| 2013/0293823 A1* | 11/2013 | Yakura | G02F 1/133365 349/153 |
| 2014/0060725 A1* | 3/2014 | Ise | G02F 1/133351 156/145 |
| 2014/0300848 A1* | 10/2014 | Mori | G02F 1/1339 349/106 |
| 2015/0021611 A1 | 1/2015 | Wang et al. | |

FOREIGN PATENT DOCUMENTS

| | | |
|---|---|---|
| CN | 202150000 U | 2/2012 |
| CN | 203084383 U | 7/2013 |
| CN | 103472629 A | 12/2013 |
| CN | 104122695 A | 10/2014 |

\* cited by examiner

DISPLAY MOTHERBOARD COMPRISING FIRST AND SECOND SUB-SUPPORTING LAYERS EACH COMPRISING A PLURALITY OF LAYER STRUCTURES AND MANUFACTURING METHOD THEREOF, DISPLAY PANEL AND DISPLAY DEVICE

FIELD OF THE INVENTION

The present invention relates to the field of display technology, and particularly, to a display motherboard and a manufacturing method thereof, a display panel and a display device.

BACKGROUND OF THE INVENTION

With the development of manufacturing technology for displays, the manufacturing technology of liquid crystal displays is developed rapidly, and the liquid crystal displays gradually replace CRT displays and become a mainstream of flat displays in future. In the field of liquid crystal display technology, thin film transistor liquid crystal displays (TFT-LCDs) are widely used in the fields of televisions, computers, mobile phones and the like due to their advantages of large size, high integration, powerful function, flexible process, low cost, and the like.

Liquid crystal panels are obtained by cutting a display motherboard 1 along cutting lines, as shown in FIGS. 1 and 2, in which each liquid crystal panel is manufactured by assembling an array substrate (i.e., a first substrate 10) and a color filter substrate (i.e., a second substrate 20) and injecting liquid crystal molecules therebetween. The liquid crystal panel has a display area Q1 and a peripheral area Q2, and positions corresponding to the peripheral area Q2 between the array substrate and the color filter substrate are sealed by a sealant 11.

At present, a thickness of a display panel of a display device is more and more thin, and the thickness is changed from 1.0 mm in early days to 0.5 mm, 0.4 mm, even to 0.2 mm. Therefore, it is necessary to perform a slimming process on the display motherboard 1 before cutting the display motherboard. After that, the display motherboard 1 is cut, so as to manufacture display panels.

However, the inventor has found at least the following problems existing in the prior art: The slimming process will cause a thickness of glass base of the display motherboard 1 to be reduced, so that the deformation amount of the glass base of the display motherboard 1 will be increased when a cutting blade is brought into contact with it during the cutting process performed on the display motherboard 1, which further leads to worse cutting conditions for the cutting blade and increased broken ratio of the glass base. Generally, the broken ratio of 0.5 mm thick glass base caused by the deformation of the glass base during the cutting process is between 0.1% and 0.2%, while the broken ratio of 0.2 mm thick glass base caused by the deformation of the glass base during the cutting process is up to 0.5% or so. Thus, how to avoid the increase of the deformation amount of the glass base when the cutting blade is brought into contact with the glass base, which is caused by thinner thickness of the glass base, becomes a technical problem having to be solved urgently.

SUMMARY OF THE INVENTION

In view of the above problem existing in the cutting process where a display motherboard is cut to form display panels, embodiments of the present invention provide a display motherboard and a manufacturing method thereof, a display panel and a display device, which can avoid damage to the glass base in the cutting process.

According to an embodiment of the present invention, there is provided a display motherboard, which includes a plurality of display panels defined by a plurality of cutting lines, each of the display panels having a display area and a peripheral area, each of the display panels including a first substrate and a second substrate provided opposite to each other, a position corresponding to the peripheral area between the first substrate and the second substrate being provided with a sealant; the display motherboard further includes a supporting layer provided between the sealant and the cutting lines, the supporting layer being provided on the first substrate and/or the second substrate for supporting the first substrate and the second substrate when cutting the display motherboard.

When the display motherboard has not been cut, the supporting layer may be in contact with both of the first substrate and the second substrate.

When the display motherboard has not been cut, the supporting layer may be in contact with either of the first substrate and the second substrate.

The supporting layer may include a first sub-supporting layer provided on the first substrate and a second sub-supporting layer provided on the second substrate.

The first sub-supporting layer may be provided opposite to the second sub-supporting layer, so that the first sub-supporting layer and the second sub-supporting layer are capable of contacting with each other when cutting the display motherboard.

The first substrate may be an array substrate, and the second substrate may be a color filter substrate.

The supporting layer may include a plurality of supporting elements spaced apart from each other.

According to an embodiment of the present invention, there is provided a manufacturing method of a display motherboard, the display motherboard including a plurality of display panels defined by a plurality of cutting lines, each of the display panels having a display area and a peripheral area, each of the display panels including a first substrate and a second substrate provided opposite to each other; the manufacturing method includes a step of forming a sealant at a position corresponding to the peripheral area on the first substrate or the second substrate, and the manufacturing method further includes a step of:

forming a supporting layer at a position on the first substrate and/or the second substrate corresponding to an area between the cutting lines and the sealant, wherein the supporting layer is used for supporting the first substrate and the second substrate when cutting the display motherboard.

The first substrate may be an array substrate, the second substrate may be a color filter substrate, and the supporting layer may include a first sub-supporting layer and a second sub-supporting layer;

the first sub-supporting layer may be formed concurrently with layers of the array substrate that are located in the display area; and the second sub-supporting layer may be formed concurrently with layers of the color filter substrate that are located in the display area.

According to an embodiment of the present invention, there is provided a display panel, which is obtained by cutting any one of the above display motherboards along the cutting lines.

According to an embodiment of the present invention, there is provided a display device, including the above display panel.

According to the display motherboard provided by embodiments of the present invention, as the supporting layer is provided between the sealant and the cutting lines, so that when the display motherboard is cut along the cutting lines to form the display panels, the supporting layer can support the first substrate and the second substrate, and the deformations of the glass bases of the first substrate and the second substrate caused by the cutting stress from the cutting blade on the first substrate and the second substrate can be avoided, which in turn avoids the damage to the glass bases of the first substrate and the second substrate during the cutting.

Figure 1:
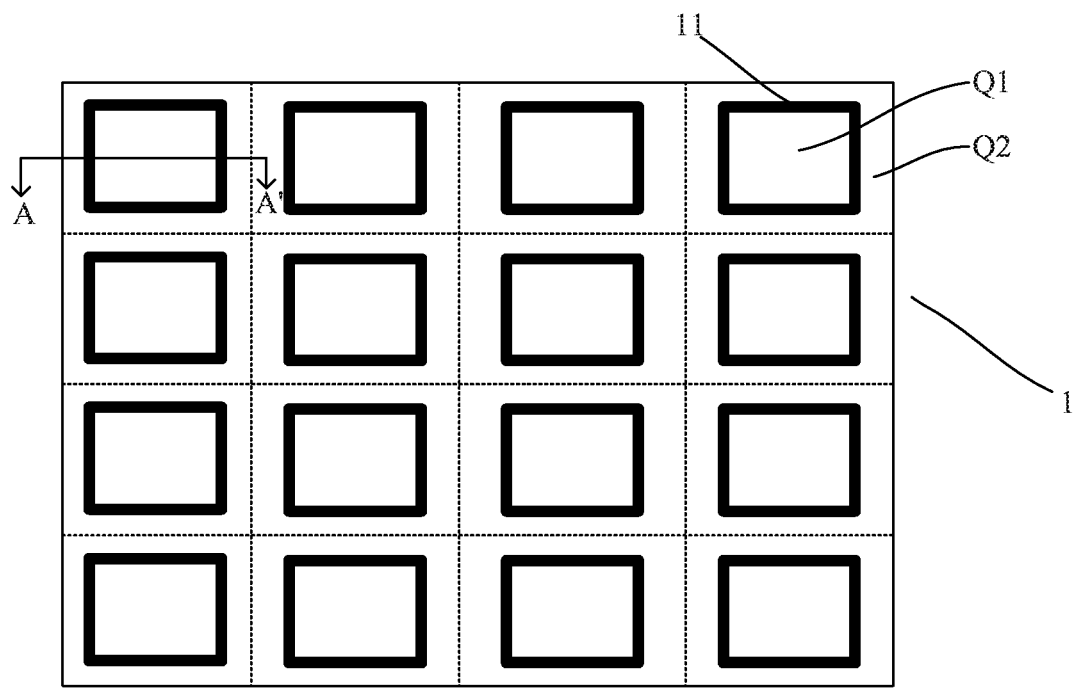
FIG. 1 is a top view of an existing display motherboard.
Figure 2:
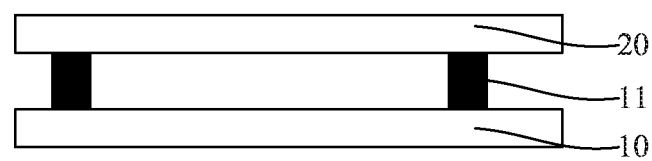
FIG. 2 is a sectional view taken along A-A' line in FIG. 1.

Reference numerals in drawings: 1. display motherboard; 10. first substrate; 20. second substrate; 11. sealant; 12. supporting layer; Q1. display area; Q2. peripheral area; 121. first sub-supporting layer; and 122. second sub-supporting layer.

DETAILED DESCRIPTION OF THE EMBODIMENTS

To make those skilled in the art better understand the technical solutions of the present invention, the present invention will be described below in details in conjunction with the accompanying drawings and specific implementations.

[Embodiment 1]

Figure 3:
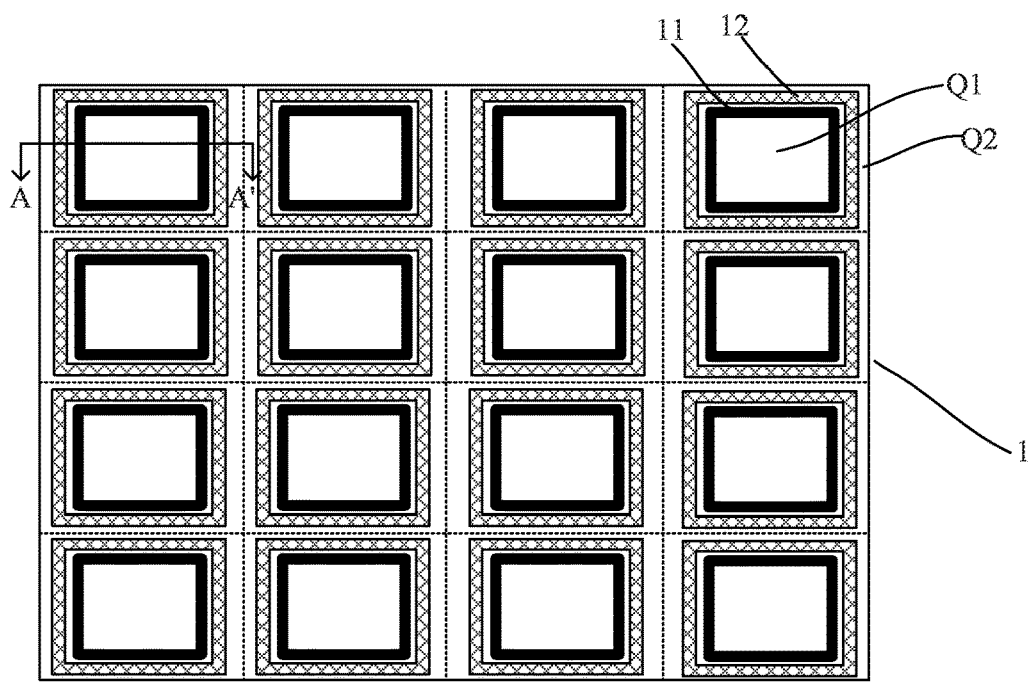
FIG. 3 is a top view of a display motherboard according to Embodiment 1 of the present invention.
Figure 4:
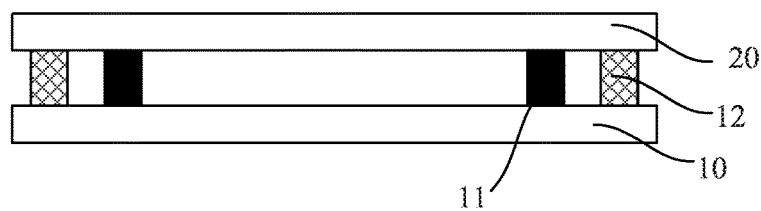
FIG. 4 is a sectional view taken along A-A' line in FIG. 3.

FIG. 3 is a top view of a display motherboard according to Embodiment 1 of the present invention, and FIG. 4 is a sectional view taken along A-A' line in FIG. 3. As shown in FIG. 3 and FIG. 4, the display motherboard 1 provided by the present embodiment includes a plurality of display panels defined by a plurality of cutting lines (i.e., dot lines shown in FIG. 3). In other words, one cutting line exists between every two adjacent display panels; each of the display panels has a display area Q1 and a peripheral area Q2, each of the display panels includes a first substrate 10 and a second substrate 20 provided opposite to each other, and a position corresponding to the peripheral area Q2 between the first substrate 10 and the second substrate 20 is provided with a sealant 11. Unlike the display motherboard (as shown in FIG. 1) in the prior art, the display motherboard 1 provided by the present embodiment further includes a supporting layer 12 provided between the sealant 11 and the cutting lines; the supporting layer 12 is provided on the first substrate 10 and/or the second substrate 20 for supporting the first substrate 10 and the second substrate 20 when cutting the display motherboard 1.

According to the display motherboard 1 provided by the present embodiment, as the supporting layer 12 is provided between the sealant 11 and the cutting lines, so that when the display motherboard 1 is cut along the cutting lines to form the display panels, the supporting layer 12 can support the first substrate 10 and the second substrate 20, and the deformations of the glass bases of the first substrate 10 and the second substrate 20 caused by the cutting stress from the cutting blade on the first substrate 10 and the second substrate 20 can be avoided, which in turn avoids the damage to the glass bases of the first substrate 10 and the second substrate 20 during the cutting.

As shown in FIG. 4, when the display motherboard 1 has not been cut, the supporting layer 12 is in contact with both of the first substrate 10 and the second substrate 20. At this time, the supporting layer 12 fully supports the first substrate 10 and the second substrate 20, so that the deformations of the glass bases of the first substrate 10 and the second substrate 20 occurred near the cutting lines can be avoided to the largest extent, which in turn avoids the damage to the glass bases of the first substrate 10 and the second substrate 20 during the cutting to the largest extent.

Figure 5:
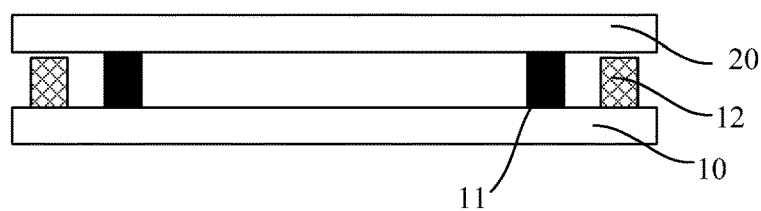
FIG. 5 is a sectional view of a display panel from the display motherboard according to Embodiment 1 of the present invention.

Alternatively, as shown in FIG. 5, when the display motherboard 1 has not been cut, the supporting layer 12 is in contact with either of the first substrate 10 and the second substrate 20 (contact with the first substrate 10 is shown in FIG. 5, it is however possible to contact the second substrate 20). In this case, the above effects can be achieved as long as ensuring that both of the first substrate 10 and the second substrate 20 can contact the supporting layer 12 when the cutting blade is brought into contact with the first substrate 10 or the second substrate 20 during the cutting process. In other words, the damage to the glass bases of the first substrate 10 and the second substrate 20 can be avoided during the cutting process as long as a distance between the supporting layer 12 and the substrate not in contact with it when the display motherboard 1 has not been cut is smaller than a maximum deformation amount that the first substrate 10 and the second substrate 20 can withstand during the cutting process.

[Embodiment 2]

Figure 6:
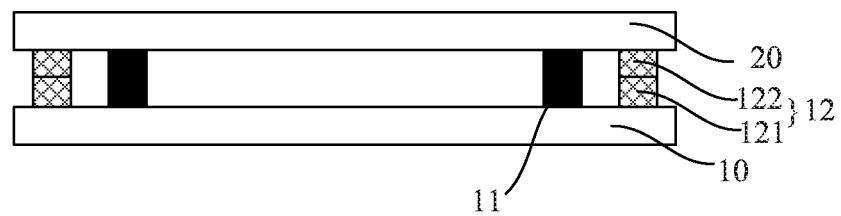
FIG. 6 is a sectional view of a display panel from a display motherboard according to Embodiment 2 of the present invention.

As shown in FIG. 6, the present embodiment provides a display motherboard, which includes a plurality of display panels defined by a plurality of cutting lines. In other words, one cutting line exists between every two adjacent display panels; each of the display panels has a display area Q1 and a peripheral area Q2, each of the display panels includes a first substrate 10 and a second substrate 20 provided opposite to each other, and a position corresponding to the peripheral area Q2 between the first substrate 10 and the second substrate 20 is provided with a sealant 11. Unlike the display motherboard (as shown in FIG. 1) in the prior art, the display motherboard provided by the present embodiment further includes a supporting layer 12 provided between the sealant 11 and the cutting lines; the supporting layer 12 includes a first sub-supporting layer 121 provided on the first substrate 10 and a second sub-supporting layer 122 provided on the second substrate 20.

In the present embodiment, the first substrate 10 may be an array substrate, and the second substrate 20 may be a color filter substrate.

For example, the first sub-supporting layer 121 may be formed concurrently with layers of the array substrate 10 that are located in the display area Q1. Specifically, taking the array substrate 10 including bottom gate type thin film transistors as an example, the array substrate 10 includes a gate (and a gate line provided in the same layer as the gate), a gate insulation layer, an active layer, a source and a drain (and a data line provided in the same layer as the source and the drain), a passivation layer, and a pixel electrode, which are successively provided on the glass base and are located in the display area Q1. It can be understood that, as an insulation layer, the gate insulation layer and the passivation layer are of a single-layered structure, therefore any of them is of a structure connected as a whole in both of the display area Q1 and the peripheral area Q2, while other layers of the thin film transistor and the pixel electrode are provided in the display area Q1 only.

In the present embodiment, as the first sub-supporting layer 121 is formed concurrently with the layers of the array substrate 10 that are located in the display area Q1, the first sub-supporting layer 121 is of a multilayered structure, and it includes a first layer structure (disconnected from the gate) that is formed concurrently with the gate, a second layer structure (i.e., a part of the gate insulation layer that is located in the peripheral area Q2) that is located above the first layer structure, a third layer structure (disconnected from the active layer) that is formed concurrently with the active layer and located above the second layer structure, a fourth layer structure (disconnected from the source and the drain) that is formed concurrently with the source and the drain and located above the third layer structure, a fifth layer structure (i.e., a part of the passivation layer that is located in the peripheral area Q2) that is located above the fourth layer structure, and a sixth layer structure (disconnected from the pixel electrode) that is formed concurrently with the pixel electrode and located above the fifth structure. From a top view of the array substrate 10, it can be seen that the shape of the first sub-supporting layer 121 is a rectangle surrounding the sealant 11. Alternatively, the first, third, fourth and sixth layer structures may be prepared as a plurality of supporting elements spaced apart from each other, such that the supporting layer 12 includes the plurality of supporting elements spaced apart from each other. In general, a thickness of thus formed first sub-supporting layer 121 is equal to a total thickness of the layers of the array substrate 10 that are located in the display area Q1.

Similarly, the second sub-supporting layer 122 is formed concurrently with layers of the color filter substrate 20 that are located in the display area Q1. Generally, the color filter substrate 20 includes a color filter layer (red, green and blue filter layer), a black matrix and a spacer, which are successively provided on the glass base. The second sub-supporting layer 122 includes a first layer structure that is formed concurrently with the color filter layer, a second layer structure that is formed concurrently with the black matrix and located above the first layer structure, and a third layer structure that is formed concurrently with the spacer and located above the second layer structure.

It can be understood that, a thickness of the supporting layer 12 consisting of the above first sub-supporting layer 121 and the second sub-supporting layer 122 is equal to a distance between the glass base of the color filter substrate 20 and the glass base of the array substrate 10 after the color filter substrate 20 and the array substrate 10 are assembled. Thus, after the array substrate 10 that is provided with the above structure of the first sub-supporting layer 121 and the color filter substrate 20 that is provided with the above structure of the second sub-supporting layer 122 are assembled, the first sub-supporting layer 121 and the second sub-supporting layer 122 are simply contacted with each other. At this time, the supporting layer 12 consisting of the first sub-supporting layer 121 and the second sub-supporting layer 122 fully supports the array substrate 10 and the color filter substrate 20, such that the deformations of the glass bases of the array substrate 10 and the color filter substrate 20 occurred near the cutting lines can be avoided to the largest extent, which in turn avoids the damage to the glass bases of the array substrate 10 and the color filter substrate 20 during the cutting to the largest extent.

As shown in FIG. 6, the first sub-supporting layer 121 and the second sub-supporting layer 122 are provided opposite to each other, such that the first sub-supporting layer 121 and the second sub-supporting layer 122 can contact with each other when cutting the display motherboard, which in turn avoids the damage to the glass bases of the array substrate 10 and the color filter substrate 20 when cutting the display motherboard.

However, the arrangement mode of the first sub-supporting layer 121 and the second sub-supporting layer 122 is not limited to the arrangement mode in which they are opposite to each other as shown in FIG. 6, it is also possible to arrange them adjacent to each other and side by side, as long as ensuring that the first sub-supporting layer 121 provided on the array substrate 10 is capable of contacting the color filter substrate 20 and/or the second sub-supporting layer 122 provided on the color filter substrate 20 is capable of contacting the array substrate 10 when the cutting blade is brought into contact with the array substrate 10 or the color filter substrate 20 during the cutting of the display motherboard.

[Embodiment 3]

The present embodiment provides a manufacturing method of a display motherboard, wherein the display motherboard may be the display motherboard in Embodiment 1 or 2. The display motherboard includes a plurality of display panels defined by a plurality of cutting lines; each of the display panels has a display area Q1 and a peripheral area Q2, and each of the display panels includes a first substrate 10 and a second substrate 20 provided opposite to each other. The manufacturing method includes a step of forming a sealant 11 at a position corresponding to the peripheral area Q2 on the first substrate 10 or the second substrate 20; and a step of forming a supporting layer 12 at a position on the first substrate 10 and/or the second substrate 20 corresponding to an area between the sealant 11 and the cutting lines. The supporting layer 12 is used for supporting the first substrate 10 and the second substrate 20 when cutting the display motherboard.

In the present embodiment, the manufacturing method of the display motherboard will be described in details by taking an example in which the first substrate 10 is an array substrate, the second substrate 20 is a color filter substrate, a first sub-supporting layer 121 is formed on the array substrate and a second sub-supporting layer 122 is formed on the color filter substrate. In this case, the preparation order of the array substrate and the color filter substrate is flexible. In the following descriptions, the array substrate is prepared first, and then the color filter substrate is prepared, but it does not apply any limitations on the preparation order of them. The manufacturing method of the display motherboard includes the following steps 1 to 11.

At step 1, by one patterning process, a pattern of gate and gate line that is located in the display area Q1 is formed on a glass base and a pattern of a first layer structure of the first sub-supporting layer 121 is formed in the peripheral area Q2.

At step 2, a gate insulation layer is formed on the glass base subjected to step 1, the gate insulation layer covers the display area Q1 and the peripheral area Q2 and is located above the first layer structure of the first sub-supporting layer 121. At this step, a part of the gate insulation layer that is located above the first layer structure of the first sub-supporting layer 121 is formed as a second layer structure of the first sub-supporting layer 121.

At step 3, by one patterning process, a pattern of an active layer is formed on the glass base subjected to step 2 and a pattern of a third layer structure is formed above the second layer structure of the first sub-supporting layer 121.

At step 4, by one patterning process, a pattern of source and drain is formed on the glass base subjected to step 3 and a pattern of a fourth layer structure is formed above the third structure of the first sub-supporting layer 121.

At step 5, a passivation layer is formed on the glass base subjected to step 4, the passivation layer covers the display area Q1 and the peripheral area Q2 and is located above the fourth structure of the first sub-supporting layer 121. At this step, a part of the passivation layer that is located above the fourth layer structure of the first sub-supporting layer 121 is formed as a fifth layer structure of the first sub-supporting layer 121.

At step 6, by one patterning process, a pattern of pixel electrode is formed on the glass base subjected to step 5 and a pattern of a sixth layer structure is formed above the fifth structure of the first sub-supporting layer 121.

To this end, the preparation of the array substrate is finished.

At step 7, by one patterning process, a pattern of a color filter layer that is located in the display area Q1 is formed on another glass base and a pattern of a first layer structure of the second sub-supporting layer 122 is formed in the peripheral area Q2.

At step 8, by one patterning process, a pattern of black matrix is formed on the glass base subjected to step 7 and a pattern of a second layer structure is formed on the first layer structure of the second sub-supporting layer 122.

At step 9, by one patterning process, a pattern of spacer is formed on the glass base subjected to step 8 and a pattern of a third layer structure is formed on the second layer structure of the second sub-supporting layer 122.

To this end, the preparation of the color filter substrate is finished.

At step 10, a sealant 11 is applied on the color filter substrate between the second sub-supporting layer 122 and the cutting lines.

At step 11, the array substrate formed through the above steps and the color filter substrate formed through the above steps are assembled and packaged, so as to form the display motherboard.

To this end, the manufacturing of the display motherboard of the present embodiment is finished. Then, a plurality of display panels can be obtained by cutting the display motherboard along the cutting lines.

[Embodiment 4]

The present embodiment provides a display panel and a display device, in which the display panel is obtained by cutting the display motherboard of Embodiment 1 or 2 along the cutting lines. The display device includes the display panel.

The display device may be any product or part having a display function such as a liquid crystal panel, an electronic paper, a mobile phone, a tablet, a television, a display, a laptop, a digital frame, a navigator, or the like.

It can be understood that the foregoing implementations are merely exemplary embodiments adopted for the purpose of explaining the principle of the present invention, but the present invention is not limited thereto. Various modifications and improvements can be made by those skilled in the art without departing from the spirit and essence of the present invention. These modifications and improvements shall also fall within the protection scope of the present invention.

What is claimed is:

1. A display motherboard, which includes a plurality of display panels defined by a plurality of cutting lines, each of the display panels having a display area and a peripheral area, each of the display panels including a first substrate and a second substrate provided opposite to each other, a position corresponding to the peripheral area between the first substrate and the second substrate being provided with a sealant, wherein the display motherboard further includes a supporting layer provided between the sealant and the cutting lines, the supporting layer being configured to support the first substrate and second substrate when cutting the display motherboard,
wherein the supporting layer includes a first sub-supporting layer provided on the first substrate and a second sub-supporting layer provided on the second substrate,
wherein each of the first sub-supporting layer and the second sub-supporting layer is of a multilayered structure,
wherein the first substrate is an array substrate, the second substrate is color filter substrate,
wherein the first sub-supporting layer includes a first layer structure that is formed concurrently with a gate, a second layer structure as a party of a gate insulation layer that is located above the first layer structure, a third layer structure that is formed concurrently with an active layer and located above the second layer structure, a fourth layer structure that is formed concurrently with a source and a drain and located above the third layer structure, a fifth layer structure as a part of a passivation layer that is located above the fourth layer structure, and a sixth layer structure that is formed concurrently with a pixel electrode and located above the fifth structure, and
wherein the second sub-supporting layer includes a first layer structure that is formed concurrently with a color filter layer, a second layer structure that is formed concurrently with a black matrix and located above the first layer structure, and the third layer structure that is formed concurrently with a spacer and located above the second layer structure.

2. The display motherboard according to claim 1, wherein when the display motherboard has not been cut, the supporting layer is in contact with both of the first substrate and the second substrate.

3. The display motherboard according to claim 1, wherein the first sub-supporting layer is provided opposite to the second sub-supporting layer, so that the first sub-supporting layer and the second sub-supporting layer are capable of contacting with each other when cutting the display motherboard.

4. The display motherboard according to claim 1, wherein the supporting layer includes a plurality of supporting elements spaced apart from each other.

5. A manufacturing method of a display motherboard, the display motherboard including a plurality of display panels defined by a plurality of cutting lines, each of the display panels having a display area and a peripheral area, each of the display panels including a first substrate and a second substrate provided opposite to each other; the manufacturing method includes a step of forming a sealant at a position corresponding to the peripheral area on the first substrate or the second substrate, and the manufacturing method further includes a step of:

forming a supporting layer at a position corresponding to an area between the cutting lines and the sealant, wherein the supporting layer is configured to support the first substrate and the second substrate when cutting the display motherboard, wherein the supporting layer at a position corresponding to an area between the cutting lines and the sealant, wherein the supporting layer is configured to support the first substrate and the second substrate when cutting the display motherboard, wherein the supporting layer is formed to include a first sub-supporting layer provided on the first substrate and a second sub-supporting layer provided on the second substrate, wherein each of the first sub-supporting layer and the second sub-supporting layer is formed as a multilayered structure, wherein the first substrate is an array substrate, the second substrate is a color filter substrate, wherein the first sub-supportive layer is formed to have a fist layer structure that is formed concurrently with a gate, a second layer structure as a part of a gate insulation layer that is located above the first layer structure, a third layered structure that is formed concurrently with an active layer and located above the second layer structure, a fourth layer structure that is formed concurrently with a source and a drain and located above the third layer structure, a fifth layer structure as a part of a passivation layer that is located above the fourth layer structure, and a sixth layer structure that is formed concurrently with a pixel electrode and located above the fifth structure, and wherein the second sub-supporting layer is formed to have a first layer structure that is formed concurrently with color filter layer, a second layer structure that is formed concurrently with a black matrix and located above the first layer structure, and a third layer structure that is formed concurrently with a spacer and located above the second layer structure.

6. The manufacturing method according to claim 5, wherein the first sub-supporting layer is formed concurrently with layers of the array substrate that are located in the display area; and the second sub-supporting layer is formed concurrently with layers of the color filter substrate that are located in the display area.

7. A display panel, which is obtained by cutting a display motherboard along cutting lines, the display motherboard including a plurality of display panels defined by a plurality of cutting lines, each of the display panels having a display area and a peripheral area, each of the display panels including a first substrate and a second substrate provided opposite to each other, a position corresponding to the peripheral area between the first substrate and the second substrate being provided with a sealant, wherein the display motherboard further includes a supporting layer provided between the sealant and the cutting lines, the supporting layer being configured to support the first substrate and the second substrate when cutting the display motherboard, wherein the supporting layer includes a first sub-supporting layer provided on the first substrate and second sub-supporting layer and the second substrate, wherein each of the first sub-supporting layer and the second sub-supporting later is of a multilayered structure, wherein the first substrate is an array substrate, the second substrate is a color filter substrate, wherein the first sub-supporting layer includes a first layer structure that is formed concurrently with a gate, a second layer structure as a part of a gate insulation layer that is located above the first layer structure, a third layer structure that is formed concurrently with an active layer and located above the second layer structure, a fourth layer structure that is formed concurrently with a source and a drain and located above the third layer structure, a fifth layer structure as a part of a passivation layer that is located above the fourth layer structure, and a sixth layer structure that is formed concurrently with a pixel electrode and located above the fifth structure, and wherein the second sub-supporting layer includes a first layer structure that is formed concurrently with a color filter layer, a second layer structure that id formed concurrently with a black matrix and located above the first layer structure, and third layer structure that is formed concurrently with a spacer and located above the layer structure.

8. The display panel according to claim 7, wherein the display motherboard has not been cut, the supporting layer is in contact with both of the first substrate and the second substrate.

9. The display panel according to claim 7, wherein the first sub-supporting layer is provided opposite to the second sub-supporting layer, so that the first sub-supporting layer and the second sub-supporting layer are capable of contacting with each other when cutting the display motherboard.

10. The display panel according to claim 7, wherein the supporting layer includes a plurality of supporting elements spaced apart from each other.

11. A display device, which includes the display panel according to claim 7.

12. The display motherboard according to claim 1, wherein each layer of the multilayered structure of the first sub-supporting layer is formed concurrently with a corresponding layer in the display area and each layer of the multilayered structure of the second sub-supporting layer is formed concurrently with a corresponding layer in the display area.

13. The display panel according to claim 7, wherein each layer of the multilayered structure of the first sub-supporting layer is formed concurrently with a corresponding layer in the display area and each layer of the multilayered structure of the second sub-supporting layer is formed concurrently with corresponding layer in the display area.

* * * * *